R. A. FONTAINE & G. T. GREER.
DUMPING ATTACHMENT FOR VEHICLES.
APPLICATION FILED OCT. 17, 1917.

1,293,640.

Patented Feb. 4, 1919.

Witness
Geo. F. Reeves

Inventors
Robert A. Fontaine and Geo. T. Greer.
By B. W. Kadel,
Attorney

UNITED STATES PATENT OFFICE.

ROBERT A. FONTAINE AND GEORGE T. GREER, OF ROANOKE, VIRGINIA, ASSIGNORS TO AMERICAN TRUCK BODY COMPANY, INCORPORATED, A CORPORATION OF VIRGINIA.

DUMPING ATTACHMENT FOR VEHICLES.

1,293,640.   Specification of Letters Patent.   Patented Feb. 4, 1919.

Application filed October 17, 1917. Serial No. 197,052.

*To all whom it may concern:*

Be it known that we, ROBERT A. FONTAINE and GEORGE T. GREER, citizens of the United States, residing at Roanoke, in the county of Roanoke and State of Virginia, have invented certain new and useful Improvements in Dumping Attachments for Vehicles, of which the following is a specification.

This invention relates to dumping attachments for vehicles and is particularly intended for use with motor trucks. The object of the invention is to provide in connection with such vehicles, a dumping body and means for actuating the same. With such general objects in view, the invention consists of the formation, combination and arrangement of parts as will be herein set forth and claimed.

Figure 1:
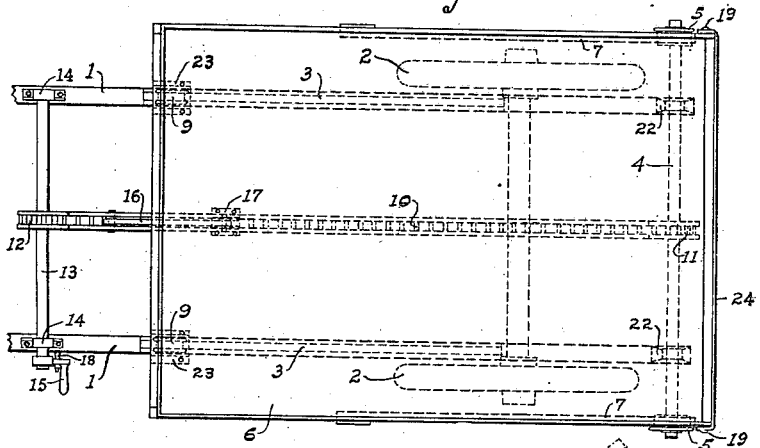
Figure 2:
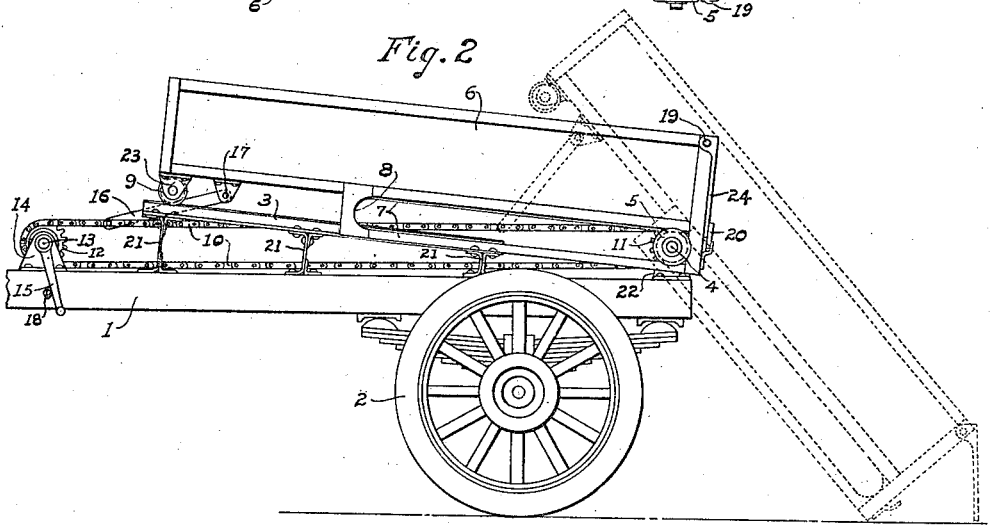

In the drawings which accompany and form a part of these specifications, Figure 1 is a plan view and Fig. 2 a side elevational view of a portion of a motor truck equipped with a preferred embodiment of the present invention.

Referring to these drawings, 1—1 represents the frames of the motor truck and 2—2 the rear ground wheels thereof. Positioned above each of the side-frame members 1 and attached thereto are additional frame members or runways 3, these being secured to the vehicle frames by means of the brackets 21. Extending transversely of the truck and journaled at 22 above the frame members 3 is a shaft 4, the same carrying wheels or rollers 5. The body 6 is supported at its rear end upon these rollers, there being runways 7 attached to the under face of the body to bear upon the rollers. These runways are made as loops to encircle and embrace the rollers to retain the body upon the said rollers, and are so arranged and proportioned that the body may retreat toward the rear of the truck until the forward ends of the loops at 8 engage the rollers 5, when the rearward movement will be arrested and the body may then swivel about the rollers 5 into a dumping position at the rear of the truck as indicated in dotted lines in Fig. 2.

The frame members 3 are made higher at the front than at the rear ends and the body is supplied with forward wheels or rollers 9, which are journaled in bearings 23 attached to the under face of the body. The rollers 9 bear upon the inclined runways 3 and thus support the front end of the body. The runways or loops 7 are set to substantially the same angle as the frame members 3 so that when not held in place by retaining means, the body may retreat by gravity down the inclined ways and swivel of its own weight into dumping position.

For drawing the body up the incline into carrying position a flexible belt member such as the chain 10 is provided, this engaging a sprocket 11 on the shaft 4 and extending longitudinally of the machine, beneath the body, to a similar sprocket 12, which is secured upon a transversely-disposed shaft 13 at the front of the body. This shaft is journaled at 14 to the frame of the machine and is also supplied with a crank 15 for rotating it. A link 16 is attached at one end to the chain 10 and at the other end to the body near its front end at 17. When the crank is rotated the movement of the chain will, through the link 16, and through the friction of the rear wheels 5, draw the body up the incline into carrying position, where it may be held by any suitable means such as a lock pin 18. The link 16 allows the front end of the body to swing upward in dumping, this link lying more nearly parallel with the chain when the body is in carrying position.

The chain may also be used for causing the body to retreat to dumping position if desired.

The rear end of the body is closed by means of a hinged end 24, the same being pivoted at 19 to the body and normally held shut by any approved latch or lock such as indicated at 20.

The improvements thus described are applicable to a variety of trucks and bodies and form a simple, yet efficient means for operating and controlling such devices.

It will be understood that embodiments of the invention other than that depicted in the drawings are contemplated and that such may be made, within the scope of the claim, without departing from the spirit of the invention.

Having thus described an embodiment of the invention, what is claimed is:

In a vehicle, a body formed and adapted to be moved to varying positions longitudinally of the vehicle and to swivel about a transverse axis into a dumping position at the rear of the vehicle, a pair of spaced shafts disposed parallel with each other and at right angles to the direction of movement of the body, the same being journaled upon the vehicle and the rear of the two forming the swiveling axis for the body, each of said shafts carrying a wheel, a belt-like member traversing said wheels, a link attached at one end to the belt-like member and at the other end to the body, propulsion wheels carried by the rear of the two shafts, and runways upon the body adapted to engage and bear thereupon, stops upon the body adapted to engage the propulsion wheels and to arrest the longitudinal movement of the body and to cause the swiveling movement, and means operatively connected to one of the shafts for rotating the same, the parts being so connected that the said rotation will produce simultaneous movement of the belt-like member and rotation of the propulsion wheels.

In testimony whereof we affix our signatures.

ROBERT A. FONTAINE.
GEORGE T. GREER.

Copies of this patent may be obtained for five cents each, by addressing the "Commissioner of Patents, Washington, D. C."